(12) United States Patent
Lin

(10) Patent No.: US 6,577,501 B2
(45) Date of Patent: Jun. 10, 2003

(54) REMOVABLE POWER PACK SUPPLY FOR COMPUTER CABINET

(75) Inventor: Chun Hsiung Lin, Duluth, GA (US)

(73) Assignee: Macase Industrial Group Ga., Inc., Norcross, GA (US)

(*) Notice: Subject to any disclaimer, the term of this patent is extended or adjusted under 35 U.S.C. 154(b) by 127 days.

(21) Appl. No.: 09/846,110

(22) Filed: Apr. 30, 2001

(65) Prior Publication Data

US 2002/0159230 A1 Oct. 31, 2002

(51) Int. Cl.7 .................................................. G06F 1/16
(52) U.S. Cl. ........................ 361/686; 361/727; 361/759
(58) Field of Search ................................ 361/683, 686, 361/695, 725; D13/110; 248/553; 70/58

(56) References Cited

U.S. PATENT DOCUMENTS

| | | | |
|---|---|---|---|
| 5,450,271 A | * 9/1995 | Fukushima et al. | ......... 361/386 |
| 5,563,767 A | 10/1996 | Chen | |
| 5,612,854 A | 3/1997 | Wiscombe et al. | |
| 5,694,290 A | 12/1997 | Chang | |
| 5,767,445 A | 6/1998 | Wu | |
| 5,808,867 A | 9/1998 | Wang | |
| 5,828,548 A | 10/1998 | Chen | |
| 5,911,589 A | 6/1999 | Chen | |
| 5,947,572 A | 9/1999 | Chang | |
| 5,949,652 A | * 9/1999 | McAnally et al. | .......... 361/726 |
| 5,949,653 A | 9/1999 | Weng | |
| 5,959,834 A | 9/1999 | Chang | |
| 5,973,947 A | 10/1999 | Shih | |
| D418,808 S | 1/2000 | Lee | |
| D421,245 S | * 2/2000 | Weng | ........................ D13/110 |
| D431,810 S | 10/2000 | Weng | |
| 6,158,105 A | * 12/2000 | Suh | ............................. 29/453 |
| D435,828 S | 1/2001 | Chou | |
| D436,075 S | * 1/2001 | Chou | ........................ D13/110 |
| 6,169,661 B1 | 1/2001 | Lee | |
| 6,466,433 B1 | * 10/2002 | Diaz et al. | .................. 361/683 |

\* cited by examiner

Primary Examiner—Darren Schuberg
Assistant Examiner—Anthony Q. Edwards
(74) Attorney, Agent, or Firm—Hinkle & O'Bradovich, LLC

(57) ABSTRACT

A removable power supply that can be manually inserted and removed from a computer cabinet is disclosed. The power supply includes typical power supplying circuitry that can easily be connected to the computer circuitry thereby supplying necessary power. The power supply further includes an interlocking system that locks the power supply top a computer cabinet and provides a further power switch.

12 Claims, 3 Drawing Sheets

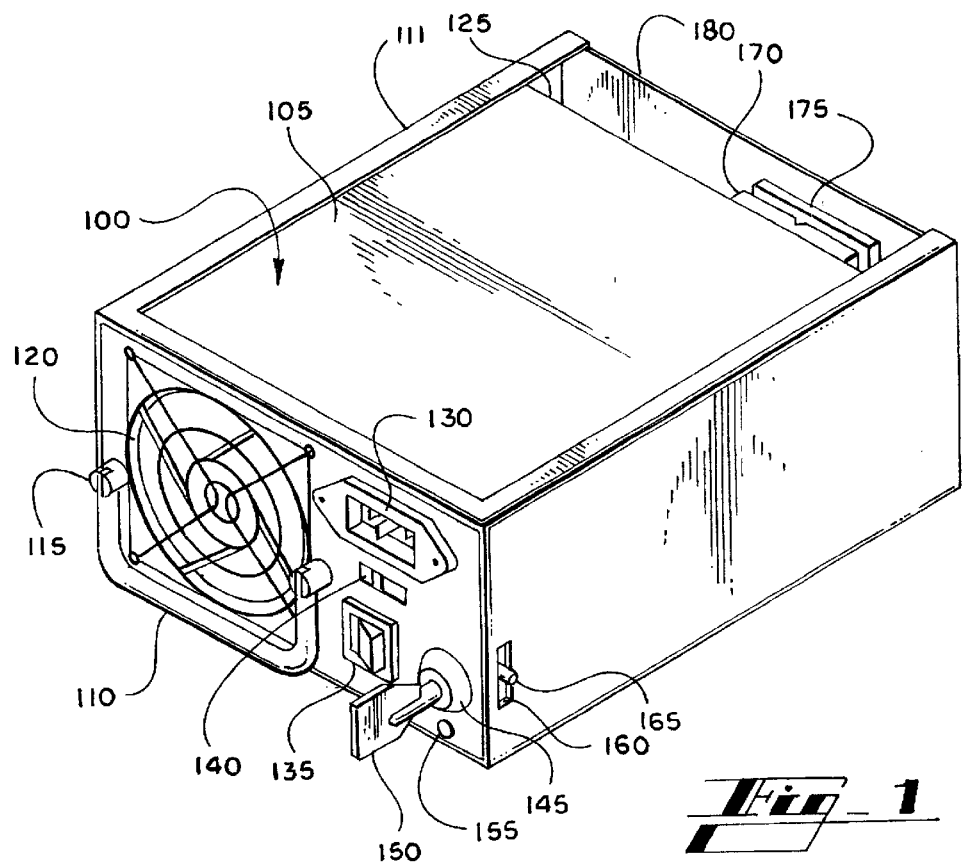
Fig_1
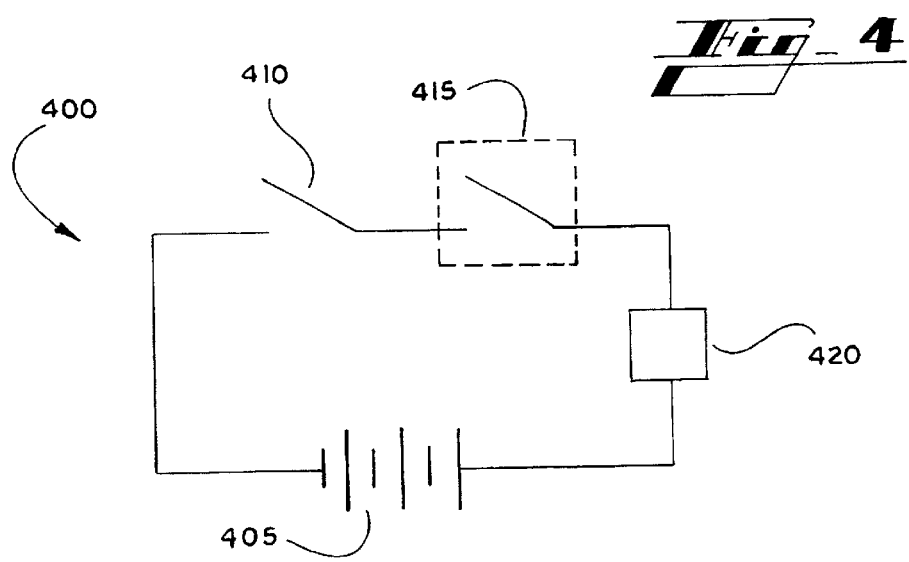
Fig_4

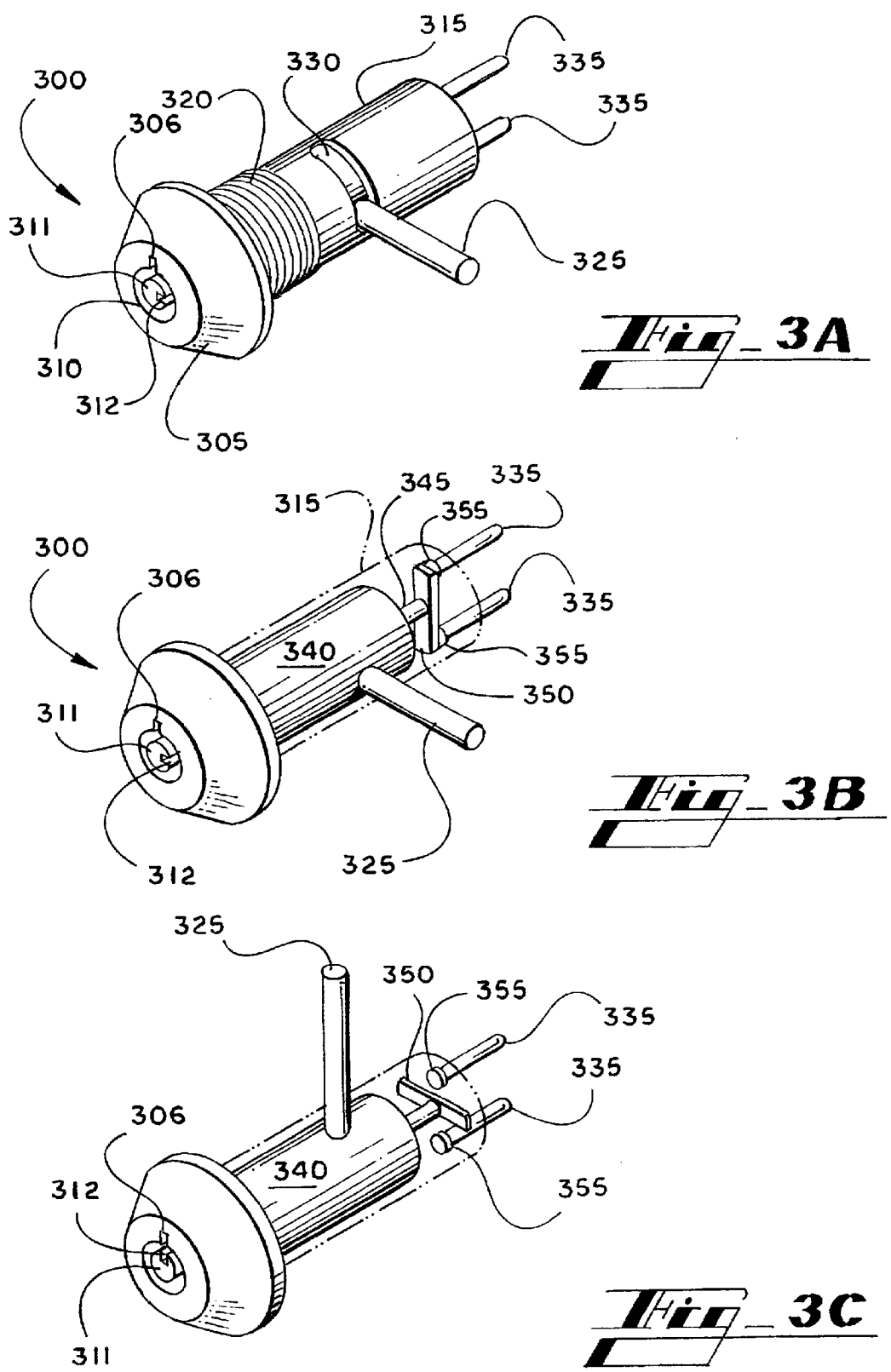

REMOVABLE POWER PACK SUPPLY FOR COMPUTER CABINET

BACKGROUND OF THE INVENTION

I. Field of the Invention

The present invention relates generally to the field of power supplies, and more particularly to a removable power supply for computers.

II. Description of the Related Art

Modern computers include self-contained power supplies that are integral with the computer. Often times the power supplies malfunction and have to be removed from the computer and replaced. Often times the computer has to be dismantled and all the connecting wires have to be removed in order to remove the malfunctioning power supply. When the new power supply is connected, all of the wires have to be replaced and the computer put back together.

SUMMARY OF THE INVENTION

In accordance with the present invention and the contemplated problems which have and continue to exist in this field, the invention features a removable power supply that can be manually inserted and removed from a computer cabinet without dismantling the computer. All of the connecting wires are automatically connected when the power supply is inserted.

In general, in one aspect, the invention features a computer power supply, including a housing having a first end and a second end, the housing being adapted to insert into a computer cabinet, power supplying circuitry enclosed in the housing, a locking device located on the first end of the housing and a plurality of electrical connectors located on the second end of the housing, the electrical connectors being adapted to connect to corresponding electrical connectors on the computer cabinet.

In one implementation, the locking device includes a switch, a locking pin adapted to secure the housing to the computer cabinet and a key adapted to move the locking pin and the switch from a first position to a second position.

In another implementation, the switch is electrically open and the locking pin is disengaged with the computer cabinet when in the first position.

In another implementation, the switch is electrically closed and the locking pin is engaged with the computer cabinet when in the second position.

In another implementation, the computer power supply includes an indicator having a first signal when the locking pin and switch are in the first position and a second signal when the locking pin and the switch are in the second position.

In still another implementation, the computer power supply includes a handle for manually inserting the power supply into the cabinet and removing the power supply from the cabinet.

In yet another implementation, the switch comprises a conducting bar adapted to bridge two connecting pins that complete the power supplying circuitry.

In another implementation, the computer power supply includes a cooling fan on the first end of the housing.

In another implementation, the computer power supply includes at least one additional cooling fan on the second end of the housing.

In another implementation, the computer power supply includes at least one opening on the second end of the housing, the at least one opening adapted to receive a cooling fan connected to the computer cabinet.

In another implementation, the computer power supply includes a power switch.

In another aspect, the invention features an interlocking system including a lock a locking pin connected to the lock and a electrical switch connected to the lock.

In one implementation, the locking pin is adapted to engage with a slit on a computer cabinet to lock the cabinet to the interlocking system.

In another implementation, the electrical switch is adapted to turn a power supply on and off.

In another implementation, the electrical switch comprises a conducting bar adapted to create an electrical connection within the power supply.

In still another aspect, the invention features a computer system, including a computer cabinet computer circuitry enclosed by the computer cabinet, the computer circuitry having receiving connections for a power supply, a removable power supply, including a housing having a first end and a second end power supplying circuitry enclosed in the housing, an interlocking system located on the first end of the housing and electrical connectors located on the second end of the housing, the electrical connectors being adapted to connect to the receiving connections.

In one implementation, the interlocking system includes a lock a locking pin connected to the lock and adapted to lock and unlock the power supply to the computer cabinet and an electrical switch connected to the lock and adapted to activate the power supply.

In another implementation, the electrical switch includes connecting pins and a conducting bar adapted to bridge the connecting pins.

In another implementation, the connecting pins activate the power supply when bridged by the conducting bar.

In another implementation, the computer system includes an indicator having a lock signal and an unlock signal.

One advantage of the invention is that a malfunctioning power supply can easily be removed and replaced with a functioning powers supply without having to dismantle the computer and with little downtime.

Another advantage is that the power supply can be locked into the computer and can not be activated unto it is locked into place, thereby preventing inadvertent removal of the power supply when the computer is powered on.

Another advantage is that all internal wires are automatically connected thereby providing the necessary power to all the internal computer circuitry when the power supply is inserted.

Other objects, advantages and capabilities of the invention will become apparent from the following description taken in conjunction with the accompanying drawings showing the preferred embodiment of the invention.

BRIEF DESCRIPTION OF THE DRAWINGS

FIG. 1 illustrates an embodiment of a removable power supply connected to a computer cabinet;

FIGS. 3A–3C illustrate several positions of an embodiment of an interlock system for a removable power supply; and FIG. 4 illustrates a schematic diagram for an embodiment of a removable power supply connected to a load.

DETAILED DESCRIPTION OF THE INVENTION

Figure 2:
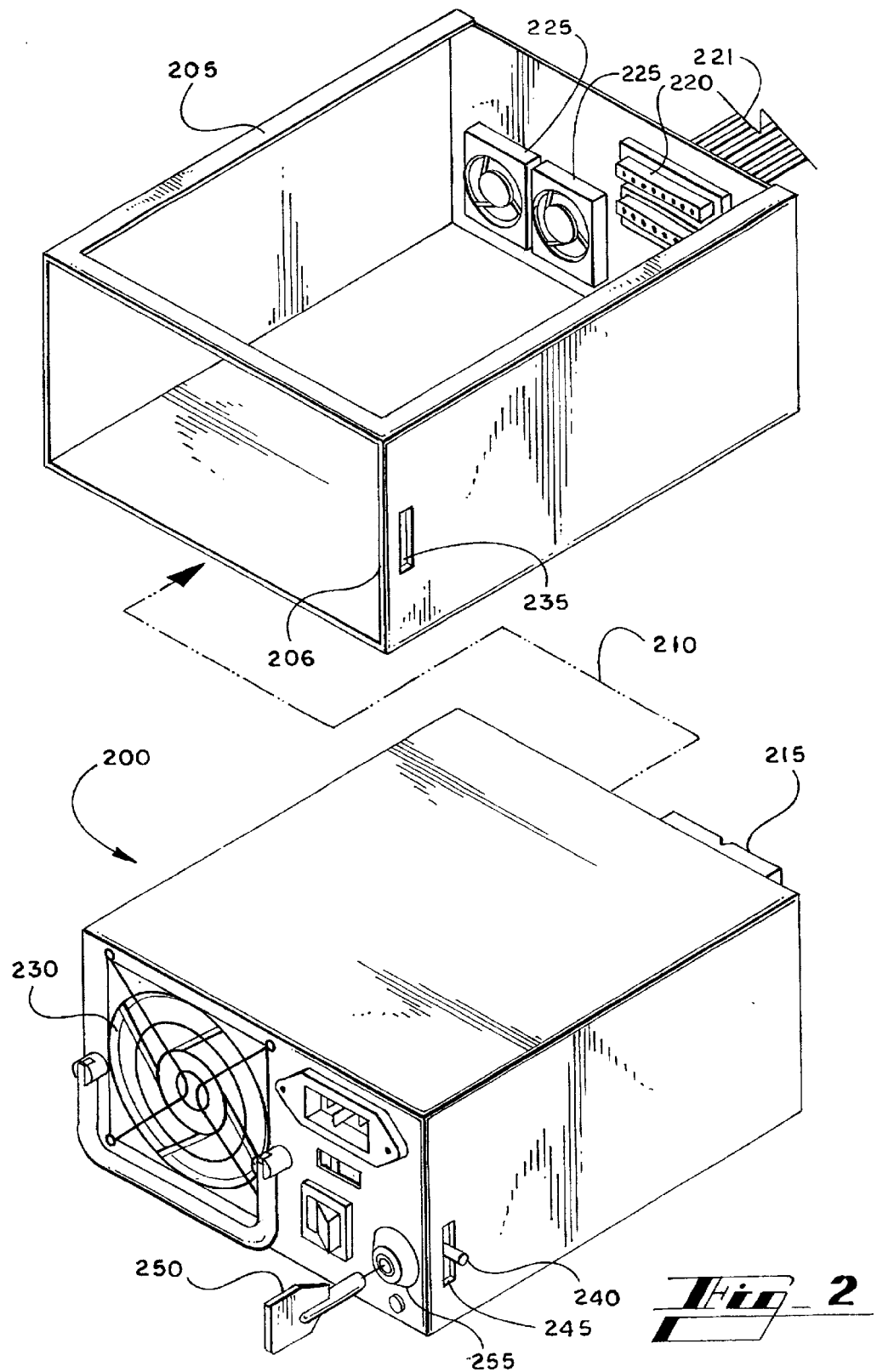
FIG. 2 illustrates the removable power supply of FIG. 1 in its placement into a computer cabinet.

Referring to the drawings wherein like reference numerals designate corresponding parts throughout the several figures, reference is made first to FIG. 1 which illustrates an embodiment of a removable power supply 100 connected into a computer cabinet 111. The power supply 100 is typically a self-contained unit and operates independently of a computer (not shown). The power supply includes an outer case 105 that houses typical components for power requirements for a computer, typically converting line power to power suitable for computer use. The power supply further includes a handle 110. The handle 110 can be used for easy insertion and removal of the supply 100 in and out of the computer cabinet 111. The computer cabinet 111 shown in FIG. 1 is only a portion of the computer. The handle 110 pivots on a hinge 115. The supply 100 can also include a rear fan 120. The rear fan 120 is used to remove heat from heating components inside the case 105. The supply 100 can also include one or more fans (not shown) on a opposite side 125 of the supply. These fans can also be used to remove heat from the interior of the case 105. In another embodiment, the rear panel 125 can have openings (not shown) that are adapted to receive fans connected to the computer cabinet 111 into which the supply 100 is inserted. A detailed description of the insertion of the supply 100 into the computer case 111 is discussed below with respect to FIG. 2. In either of the embodiments, the interior of the case 105 receives air flow for the removal of heat.

The supply 100 further includes a power receptacle 130 that is used to receive line power typically alternating current (AC). Standard power cords can be used to connect to receptacle to provide power to the supply 100. Typically, the line power is 110/115 volts and 220/230 volts. A switch 135 is included in the supply 100 to turn the supply 100 on and off. A line option switch 140 is also included to change the supply's ability to receive different line power. In an embodiment, the switch 140 has two positions, one for 110/115 volts and the other position for 220/230 volts.

The supply further includes several components that make up an interlocking system that is described in further detail below with respect to FIGS. 3A–3C. A lock 145 is the first part of the system. A key 150 can be inserted into the lock 145 to lock the supply 100 into the computer cabinet and unlock the supply 100 from the cabinet. A slit 160 on the side of the computer cabinet 111 is adapted to receive a locking pin 165. The locking pin 156 is used to secure the supply 100 into the computer cabinet. The supply can further include an indicator 155 that signals when the supply is locked into place. In an implementation, the indicator is a light emitting diode (LED) that remains unlit when the lock 145 is in the unlocked position and lights up when the lock 145 is in the locked position. It is understood that the indicator 165 can be any type of device that indicate whether or not the lock 145 is in the locked or unlocked position.

In one embodiment, the interlock system is not only used to lock the supply 100 into the computer cabinet but is also used as an additional switching mechanism. As discussed above, the switch 135 is used to turn the supply 100 on and off. The interlock system can also be used to turn the supply 100 on and off. When the lock 145 is in the unlocked position, the interlock system does not allow power to flow into the supply 100. When the lock 145 is in the locked position, power is allowed to flow into the supply 100. In such an arrangement, it is necessary for both the lock 145 to be locked and the switch 135 placed into the on position for the supply 100 to operate. This feature helps to ensure that the supply is not inadvertently removed from the computer cabinet 111 while the computer is powered on. Such a removal can potentially cause damage to the computer as well as to software and files on the system. FIG. 1 illustrates the supply 100 locked into the computer cabinet 111.

The supply further includes a power conduit 170 located in the opposite side 125. The power conduit 170 can be connected to a receiving conduit 175 on a wall 180 of the cabinet 111. In one embodiment, the power conduit 170 includes one or more sockets/plugs that can connect into corresponding plugs/sockets inside the computer cabinet to provide power to the appropriate components (e.g., hard drives, CD ROMS, fans and other internal computer components). Therefore, when the supply 100 is inserted into the cabinet 111, all the necessary internal wiring is automatically connected. In another embodiment, the conduit 170 can include a series of wires that can be directed to the appropriate components inside the cabinet. In this embodiment, the user manually connects all the wires.

FIG. 2 illustrates the removable power 200 supply of FIG. 1 in its placement into a computer cabinet 205. An arrow 210 illustrates the relative placement of the supply 200 within the cabinet 205. A power conduit 215 can be directly connected to a receiving conduit 220 located in the cabinet 205. Wires 221 are connected to the receiving conduit 220 in order to deliver power to the internal components of the computer. As shown in FIG. 2 there can be more than one power and receiving conduit depending on the power needs of the computer. It is understood that several different embodiments of the removable power supply 200 can be made to accommodate the various different types of computers that exist.

FIG. 2 also illustrates fans 225 that can line up with openings (not shown) in the supply. As described above, the fans 225 can be located in the supply 200 itself similar to fan 230, but in the opposite wall of the supply 200.

A slit 235 is located on the side of the cabinet 205 to receive the locking pin 240. The locking pin 240 can be retracted and extended from a slit 245 on the supply 200. In FIG. 2, the locking pin 240 is retracted from the slit 245. The key is positioned near the lock 255. The key 250 can be used to retract the locking pin 240 so that the supply 200 can be inserted into the cabinet 205. With the locking pin 240 in the extended position, the supply 200 is not capable of being inserted into the cabinet 205 because the locking pin 240 hits against the edge 206 of the cabinet 205.

FIGS. 3A–3C illustrate several positions of an embodiment of a lock of an interlock system for a removable power supply.

FIG. 3A illustrates a lock 300 in a locked position. As described above the lock can be in a locked and unlocked position thereby locking the supply into the computer cabinet and switching the supply on and off. The lock 300 includes an outer cover 305 having an aperture 310 and transverse pin 311 that is adapted to receive a key to lock and unlock the lock 300. The transverse pin 311 has a first niche 312 that can be aligned with a second niche 306 located on the outer cover 305. In this embodiment, when the first and second niches 321, 306 are aligned, the lock 300 is unlocked. When the niches 312, 306 are not aligned, the lock 300 is in the locked position. It is understood that there are several configurations for this type of lock and that the embodiment described does not limit the lock to the one embodiment but is shown to illustrate one type of embodiment.

The lock 300 further includes an outer casing 315 having a threaded portion 320. The threaded portion 320 enables the lock 300 to be inserted screwed and thereby secured into the supply. An elongated aperture 330 is located in the casing 315 allowing a range of motion for a locking pin 325. FIG. 3A shows an embodiment of the elongated aperture that allows a range of motion of the locking pin 325 through about 90 degrees. This motion through 90 degrees is sufficient to lock and unlock the supply into the cabinet.

The lock 300 further includes external connecting pins 335. As described above, the lock can be used to switch the power supply on and off. The pins 335 are used to complete a circuit within the power supply in order to switch it on and off. A further description of this switching mechanism is described below.

FIG. 3B illustrates an internal view of the lock 300 of FIG. 3A, in the locked position. The case 315 is shown as transparent to show further internal details of the lock 300. The transverse pin 311 is connected to an internal cylinder that is connected to the locking pin 325. A rod 345 connects the internal cylinder 340 to a rectangular bar 350. The rectangular bar 350 is typically comprised of a conducting material so that it can create a conductive bridge between the connecting pins 335. When the connecting pins 335 are bridged by the rectangular bar 350 the internal circuit is complete so that the power supply is turned on. Provided that the other power switch (135 in FIG. 1) is also turned on, the power supply is functioning. FIG. 3B illustrates the connecting pins bridged by rectangular rod 350. Specifically, the rectangular rod 350 connects to contact pads 355. This position corresponds to the locked position as described above. Accordingly, the niches 306, 312 are not aligned and the power supply is locked in the cabinet.

FIG. 3C illustrates an internal view of the lock 300 of FIG. 3A, in the unlocked position. The transverse pin has been rotated by the key (not shown) thereby rotating the internal cylinder 340 and the locking pin 325. In this position the locking pin 325 has been rotated out of the slit on the supply (245 in FIG. 2) and the slit on the cabinet (235 in FIG. 2). Rectangular rod 350 has also been rotated and therefore no longer in contact with contact pads 355. Therefore, the connecting pins 335 are not bridged and the circuit is incomplete. The power supply is therefore non-functional when the lock is in this unlocked position.

FIG. 4 illustrates a schematic diagram for an embodiment of a removable power supply 400 connected to a load. The schematic illustrates a power symbol 405 connected in series with a first switch symbol 410, a second switch symbol 415 and a load symbol 420. The power symbol 405 typically represents the internal power supply circuitry as described above. The first switch symbol 410 represents the switch (135 in FIG. 1) and the second switch symbol 415 contained within the dotted box represents the interlocking system as described above. The load symbol 420 typically represents the computer circuitry that the power supply is providing power. As the schematic 400 illustrates, both switches must be closed for the power supply to be functional, thereby providing power to the load.

Therefore, the foregoing is considered as illustrative only of the principles of the invention. Further, various modifications may be made of the invention without departing from the scope thereof and it is desired, therefore, that only such limitations shall be placed thereon as are imposed by the prior art and which are set forth in the appended claims.

What is claimed is:

1. A computer power supply comprising:
   a housing having a first end and a second end, the housing being adapted to insert into a computer cabinet;
   power supplying circuitry enclosed in the housing;
   a locking device located on the first end of the housing, the locking device comprising:
      a switch having a conducting bar adapted to bridge two connecting pins that complete the power supplying circuitry,
      a locking pin adapted to secure the housing to the computer cabinet, and
      a key adapted to move the locking pin and the switch from a first position to a second position; and
   a plurality of electrical connectors located on the second end of the housing, the electrical connectors being adapted to connect to corresponding electrical connectors on the computer cabinet.

2. The computer power supply as claimed in claim 1, wherein the switch is electrically open and the locking pin is disengaged with the computer cabinet when in the first position.

3. The computer power supply as claimed in claim 1, wherein the switch is electrically closed and the locking pin is engaged with the computer cabinet when in the second position.

4. The computer power supply as claimed in claim 1 further comprising an indicator having a first signal when the locking pin and the switch are in the first position and a second signal when the locking pin and the switch are in the second position.

5. The computer power supply as claimed in claim 1 further comprising a handle for manually inserting the power supply into the cabinet and removing the power supply from the cabinet.

6. The computer power supply as claimed in claim 1 further comprising a cooling fan on the first end of the housing.

7. The computer power supply as claimed in claim 6 further comprising at least one additional cooling fan on the second end of the housing.

8. The computer power supply as claimed in claim 6 further comprising at least one opening on the second end of the housing, the at least one opening adapted to receive a cooling fan connected to the computer cabinet.

9. The computer power supply as claimed in claim 1 further comprising a power switch.

10. A computer system, comprising:
- a computer cabinet;
- computer circuitry enclosed in the computer cabinet, the computer circuitry having receiving connections for a power supply;
- a removable power supply, comprising:
  - a housing having a first end and a second end;
  - power supplying circuitry enclosed in the housing;
  - an interlocking system located on the first end of the housing, the interlocking system having a lock, a locking pin connected to the lock and adapted to lock and unlock the power supply to the computer cabinet and an electrical switch connected to the lock and adapted to activate the power supply, the electrical switch having connecting pins and a conducting bar adapted to bridge the connecting pins; and
  - electrical connectors located on the second end of the housing, the electrical connectors being adapted to connect to the receiving connections.

11. The computer system as claimed in claim 10, wherein the connecting pins activate the power supply when bridged by the conducting bar.

12. The computer system as claimed in claim 10 further comprising an indicator having a lock signal and an unlock signal.

* * * * *